United States Patent

[11] 3,565,437

[72] Inventor Tibb N. Mitchell
     Hollis, N.Y. (112-23 201st St., New York, N.Y. 11412)
[21] Appl. No 704,696
[22] Filed Feb. 12, 1968
[45] Patented Feb. 23, 1971

[54] DISCOUNT STORE BOARD GAME APPARATUS
     7 Claims, 5 Drawing Figs.
[52] U.S. Cl. .................................................. 273/134
[51] Int. Cl. .................................................. A63f 3/02
[50] Field of Search ......................................... 273/134

[56] References Cited
     UNITED STATES PATENTS
     2,026,082  12/1935  Darrow ..................... 273/134

Primary Examiner—Delbert B. Lowe
Attorney—Edward Goldberg

ABSTRACT: A game board and appurtenances represent various aspects of the retail merchandise or discount store business including special sale days, commissions and management opportunities. The apparatus includes markers to indicate each player and peg and rack boards to record and display the players' managerial position advancement. Chance means provide the number of spaces for movement of the markers along the game board. The spaces indicate particular monetary awards, which may be associated with specified sales days, or the selection of a card from different stacks which provide various awards, penalties and advanced managerial positions. A further group of store window display cards are issued which correspond with different sales day spaces on the game board. Particular combinations of display cards have specified monetary awards. The player accumulating the most money in a given time or reaching the position of President is considered the winner.

INVENTOR.
TIBB N. MITCHELL
BY Edward Goldberg
ATTORNEY

Fig. 2

SUPERVISOR STACK 20

- GO GET YOUR PARTIAL BONUS. MOVE YOUR MARKER TO PARTIAL BONUS AND COLLECT.
- YOUR WINDOWS ARE BROKEN. YOU LOSE WINDOW CARDS FOR TWO TURNS.
- NO PARTIAL BONUS. HOLD THIS CARD.
- ANNUAL BONUS CUT IN HALF. HOLD THIS CARD.
- SUPERVISOR LIKES YOUR STORE. ALLOWS YOU TO USE MORE DISPLAY AREA. YOU MAKE $25.00
- ANNUAL BONUS CUT TO $50.00. HOLD THIS CARD.
- YOU GET TRANSFERRED TO OUTER MONGOLIA, CAN'T FIND STORE, LOSE TWO TURNS.
- POOR PAPER WORK. COST YOU $100.00
- YOU GET $10.00 SECURITY AWARD
- SUPERVISOR INCREASES YOUR SHIPMENT OF MERCHANDISE. YOU MAKE $50.00
- HALF THE LIGHTS IN YOUR STORE OFF. YOU LOSE $100.00
- GO GET YOUR ANNUAL BONUS. MOVE YOUR MARKER TO ANNUAL BONUS AND COLLECT.
- IDIOT! OF THE WEEK. CHOCOLATE CANDY MELTS IN YOUR WINDOW. YOU LOSE $100.00
- YOU GET $5,000 LIFE INSURANCE POLICY. HOLD THIS CARD.
- FLOOD IN YOUR STORE, WATER DAMAGE. YOU LOSE $100.00
- UP-A-PEG
- BUSINESS VERY GOOD, REGISTER BURNS OUT. YOU LOSE $25.00
- DOWN-A-PEG
- YOU GET KING STREET STORE. THE KIDDIES STEAL $100.00 IN SHIRTS.
- DOWN-A-PEG HOLD CARD
- YOU GET THE LA-BONE-IA STREET STORE, KIDDIES GET YOU FOR $50.00

OFFICE STACK 30

- SPECIAL SALE PRICES SLASHED. YOU LOSE $100.00
- YOU GET $100.00 FOR HOT IDEA ON SELLING DOG FOOD BOW WOW!
- YOUR SHIPMENT OF MERCHANDISE IS LATE. YOU LOSE $100.00
- YOU GET LEAFLET SALE FROM OFFICE, SALES UP! YOU MAKE $50.00
- POOR PAPER WORK. COST YOU $50.00
- YOU GET THE BLIGHTON STREET STORE. LOSE YOUR MIND AND TWO TURNS.
- TRUCK DRIVER DROPS CASES OF GLASS BOTTLED SHAMPOO. YOU LOSE $75.00
- YOUR CLAIM FOR SHORTAGE IN MERCHANDISE DENIED. YOU LOSE $50.00
- TRAINEES DAMAGE YOUR TOYS DURING INVENTORY. YOU LOSE $50.00
- YOUR INVENTORY SHORT. YOU LOSE $200.00
- YOU PUT THE WRONG MERCHANDISE ON SALE. YOU LOSE $50.00
- YOUR SHIPMENT OF MERCHANDISE ARRIVES EARLY. YOU MAKE $100.00
- YOU RUN OUT OF BAGS TO WRAP CUSTOMER PURCHASES. YOU LOSE $75.00
- YOUR SHIPMENT SHORT 5 CASES OF MERCHANDISE. YOU LOSE $75.00
- YOU GET ONE WEEK VACATION WITH PAY. GO TO PAY DAY AND COLLECT.
- YOU GET CREDIT FOR MERCHANDISE LOST IN TRANSIT. YOU MAKE $75.00
- PRESIDENT OF THE COMPANY

DISTRICT MANAGER STACK 32

- D.M. BRINGS YOU SOME REAL FAST SELLERS. YOU MAKE $50.00
- GOOD DISPLAY OF RING BINDERS MAKES YOU MONEY $50.00
- SHELF FALLS DOWN WITH YOUR COSMETICS, YOU HAD A SCREW LOOSE. YOU LOSE $50.00
- YOUR D.M. SETS UP A SPECIAL SALE IN YOUR STORE. YOU MAKE $50.00
- D.M. BRINGS YOU SOME REAL SLOW SELLERS. YOU LOSE TIME AND MONEY. $25.00
- YOU ARE TOP MONEY MAKER THIS WEEK. YOU WIN $25.00 BONUS.
- D.M. FORGETS TO BRING YOU SALE MERCHANDISE. YOU LOSE $25.00
- YOU GET STUTTER STREET STORE AND LOSE YOUR VOICE SCREAMING AT KIDDIES AND LOSE TWO TURNS.
- LONG JOHNS IN THE WINDOW IN JULY. YOU LOSE $50.00
- YOU SELL OUT OF SALE MERCHANDISE BEFORE SALE. YOU LOSE $100.00
- YOUR WINDOWS NOT RIGHT, POOR CHOICE OF MERCHANDISE. YOU LOSE $75.00
- YOUR STORE BROKEN INTO, YOU LOSE $75.00 IN PETTY CASH.
- YOU ARE BUM OF THE WEEK. YOU PUT CRAYONS IN THE WINDOW, THEY MELT. YOU LOSE $25.00
- CUSTOMER DROPS CIGARETTE IN PLASTIC TRASH BARREL. FLASH FIRE COSTS YOU $25.00
- D.M. DOES NOT LIKE THE WAY YOUR STORE IS ARRANGED. YOU LOSE $50.00
- THE D.M. GIVES YOU AN OUTSIDE TABLE. THE KIDDIES STEAL IT. YOU LOSE $50.00
- GOOD CUSTOMER RELATIONS NETS YOU $25.00
- ARRANGEMENT OF MERCHANDISE BY D.M. MAKES YOU $25.00 EXTRA
- YOU ARE THE WINNER OF THE SALE OF THE DAY PROMOTION. YOU WIN $50.00
- YOU SELL OUT OF CERAMIC ART. YOU MAKE $50.00

INVENTOR.
TIBB N. MITCHELL
BY Edward Goldberg
ATTORNEY

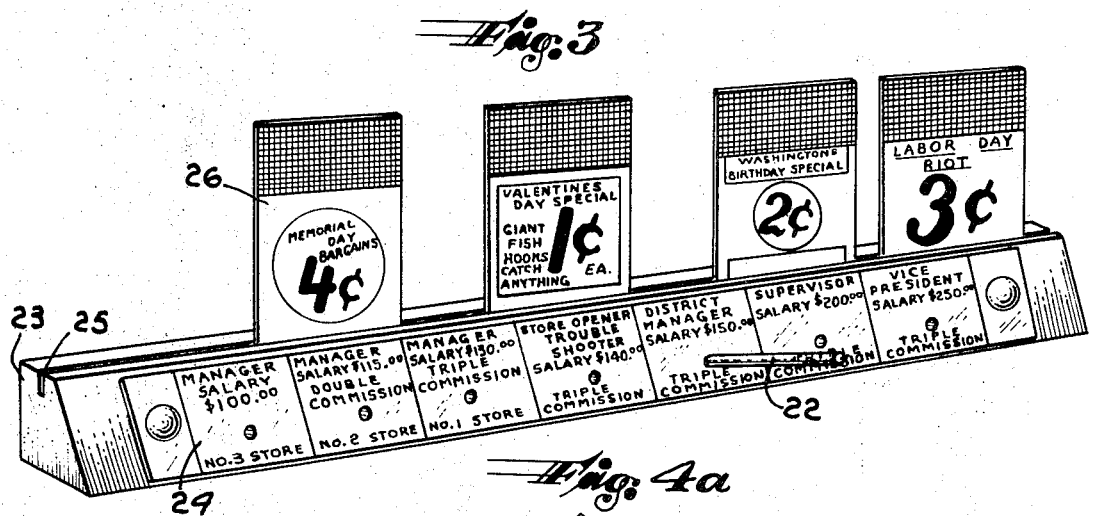
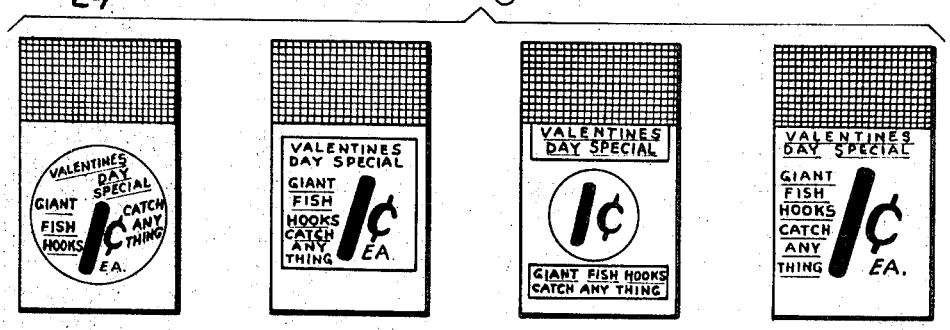
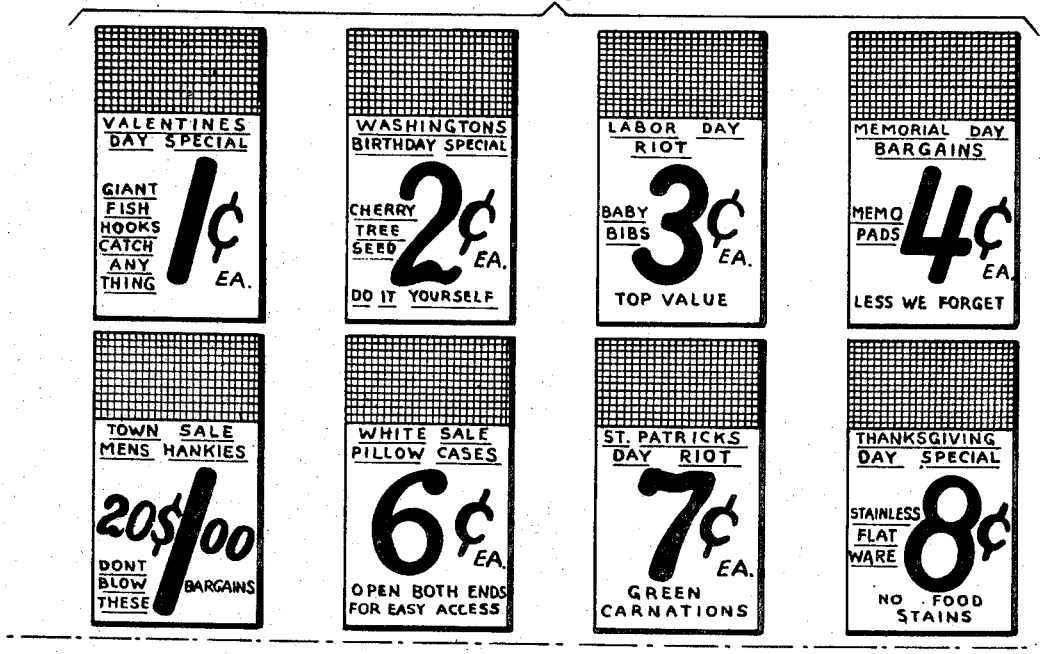

Fig. 4b (CONTINUED)
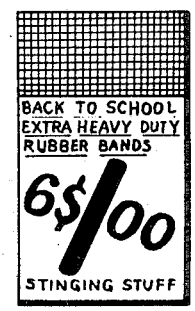
INVENTOR.
TIBB N. MITCHELL
BY Edward Goldberg
ATTORNEY

DISCOUNT STORE BOARD GAME APPARATUS

SUMMARY OF THE INVENTION

A game board is provided with a continuous path having successive spaces representing various promotional sales days, monetary awards or commissions for store managers and special card selections from stacks which provide directions as to the awards and advancement opportunities in management up to the position of President. Each player has a rack to hold a peg indicating his managerial position and a group of store front or window display cards which indicate sale days and prices of particular merchandise. A means of chance such as a spinner or dice determines the number of spaces each player moves his marker or token. Each space indicates a specific monetary award or an opportunity to select a card of a designated stack. The cards indicate various awards and penalties, advancement to higher supervisory positions with higher salaries and commissions, or demotions. Store window display cards from a special deck are dealt to all the players before each one's turn. The number of cards issued depends upon the managerial position of each player. The display cards correspond to sale days on the board spaces and are grouped in suits of repetitive numbers indicating prices of goods, with selected combinations having particular monetary award values. In addition, each time the players pass the Start-Pay Day position, they collect their salary. The player having the most money within a specified time limit or attaining the position of President of the company wins the game.

BRIEF DESCRIPTION OF THE DRAWINGS

FIG. 2 shows the directions indicated on various card stack selections;

FIG. 3 shows a rack and peg arrangement indicating management positions and holding store front or window display cards; and FIGS. 4a and 4b show examples of the display cards associated with various sales promotion days.

DESCRIPTION OF THE PREFERRED EMBODIMENT

Figure 1:
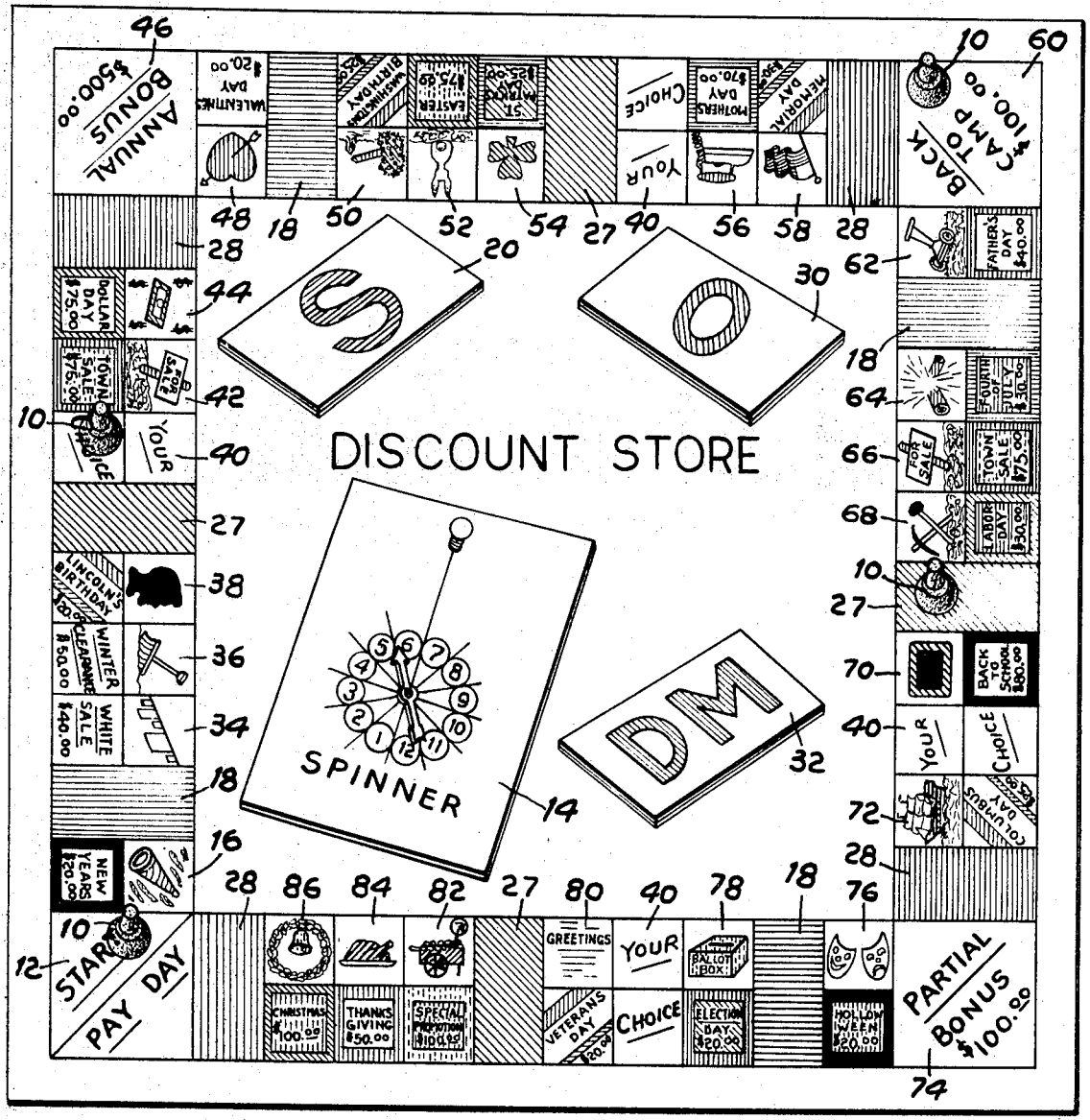
FIG. 1 shows the game board, markers, and spinner, with the various spaces indicating sale days, commissions, and card selection.

Before the start of the game, the players must read the rules. Each player then selects a token or board marker of a different color and a store window display card rack and peg position marker with a matching colored peg. No money is issued but can only be earned during the game. One player is chosen in advance to handle all the game play money and another to deal window display cards. Any monetary penalties which cannot be paid before sufficient money is earned are held and deducted from future earnings. The players spin the spinner or throw dice to determine the order of play. The highest number starts first with the others following in a clockwise manner around the board.

At the start of play, two window display cards are dealt to each player as managers of number 3 stores, which is the lowest level position. As the game progresses and the players advance in position to managers of number 2 stores, they receive higher salaries, double commissions and four display cards. Number 1 store managers and above receive still higher salaries, as indicated later on the rack and peg markers, triple commissions and six display cards. Certain penalties, however, are also doubled and tripled accordingly. The best window display card combination wins a cash award, which is paid before each player's turn, in accordance with a table to be described in further detail later. The play money may take any suitable form.

As shown in FIG. 1, each player is represented by a colored marker or token 10 which is moved from the Start position 12 a number of spaces along the board in accordance with the numbers 1—12 indicated on spinner 14 as each player takes his turn. The first space 16 indicates a New Year's Day sales promotion with an award of a $20 commission going to the player landing there. The commissions are doubled or tripled for managers of No. 2 and No. 1 stores and above, respectively, as previously noted. The next space 18 and similar spaces on each of the four sides of the board are colored blue. The player whose token lands on any one of these spaces is permitted to take a card from the stack 20 of 30 Supervisor cards marked with a blue S. The player must follow the directions on the card, such as indicated in FIG. 2. While certain cards are repeated in the same and other stacks, only one is shown. The cards provide various cash awards or penalties, management promotions or demotions designated by "Up-A-Peg" and "Down-A-Peg," and other directions, some of which are held for a later time. The penalties indicated on the selected cards are also doubled and tripled for managers of No. 2 and No. 1 stores, as for the commissions.

Each player moves his peg 22 along his rack 23, as shown in FIG. 3, in accordance with the directions on the selected card, to record his position on the graduated managerial rank scale or chart 24. If a player selects a "Down-A-Peg" card while in the lowest No. 3 store manager position, his peg is removed and he must lose two turns to simulate a dismissal and thereafter start again from the beginning. Rack 23 also provides a slot 25 for holding cards for later use and for the store front or window display cards 26.

Other spaces 27, 28 colored in green and red, respectively, on each side of the board, represent chances to select similar cards from a stack of Office cards 30, marked with a green O and a set of District Manager cards 32 marked with a red DM. One of the cards in the green Office stack indicates the position of President of the company. However, the player must first have been promoted through the ranks to the position of Vice-President, before he can accept the position of President, which wins the game. In addition, the player must be able to invest the sum of $200 as a payment to the company for the privilege of becoming President. Each time the President card is selected by an ineligible player, it cannot be used and is returned to the Office pack which is reshuffled. The alternative method of winning the game is to specify a time limit at the end of which the player having the most money is the winner.

There are four "Up-A-Peg" and five "Down-A-Peg" cards in each stack plus one "Down-A-Peg Hold" card in each. The latter card is used to demote another player and may be retained by the one selecting it until the appropriate time when it may be used to best advantage. For example, in order to prevent a Vice-President from becoming President, the player holding this card simply announces "Down-A-Peg," so that the Vice-President is reduced to a Supervisor position and can no longer have the opportunity to win the game at that time. The card is then returned to the proper stack which is reshuffled. Before using the card, it is also permissible to sell it to another player for whatever price can be obtained. Another card selection which may be held until a suitable time for use is the "$5000 Life Insurance Policy," of which there are three in both the Supervisor and Office stacks. This card is worth $5000 at the end of the game or may be sold at any time during the game for $2000 of play money or to the highest bidder.

Other spaces along the left side of the board represent further promotional sales for different days of the year with various commissions, such as White Sale, $40, at space 34, Winter Clearance, $50, at space 36, and Lincoln's Birthday, $20, at 38. When the token lands on space 40 bearing the words "Your Choice," the player is permitted to choose a card from any of the three stacks 20, 30 or 32. It is to each player's advantage to remember which cards have been used previously in order to make the best selection. Other "Your Choice" spaces appear along each side of the board. The remaining spaces along the first side include Town Sale 42 and Dollar Day 44, each having a commission of $75. The player whose token lands on the corner square 46 labeled Annual Bonus is paid $500. The corner box bonuses are not doubled or tripled in accordance with the player's rank.

As the play progresses along the top of the board, other annual sales days for various holidays during the year include Valentine's Day 48 paying a commission of $20, Washington's Birthday 50 with a $25 payment, Easter 52 for $75, St. Patrick's Day 54 at $25, Mother's Day 56 with $70 and Memorial Day 58 with a $30 commission. The next corner square 60 provides a $100 bonus on a Back to Camp sale. Continuing along the right side of the board are sales promotions for Father's Day 62, $40, Fourth of July 64, $30, Town Sale 66, $75, Labor Day 68, $30, Back to School 70, $80, Columbus Day 72, $25 and the corner 74 provides a Partial Bonus of $100. Along the bottom of the board there are Halloween 76, $20, Election Day 78, $20, Veteran's Day 80, $20, Special Sales Promotion 82, $100, Thanksgiving 84, $50 and the final holiday of the year Christmas 86, paying a $100 commission. The markers thereafter continue around the board again and as each player passes the Start-Pay Day corner box he collects his salary as listed for the Manager's position which he occupies at the time.

The winner of the best window display card combination is determined as follows. There are four groups or suits of 21 cards for a total of 84. Each card in a particular group has an assigned value of from 1 cent to $5. These are identical in value with the cards in each other group except for distinguishing markings or designs representing the four different suits, such as boxes, circles and open printing, as illustrated in FIG. 4a. A complete set in one suit is shown in FIG. 4b. The display cards indicate various sale days and prices of particular merchandise items such as: Valentine's Day Special, fish hooks, 1 cent each; Washington's Birthday, item for 2 cents; Labor Day, 3 cents; Memorial Day, 4 cents; Town Sale, 20 for $1.00; White Sale, 6 cents; St Patrick's Day, 7 cents; Thanksgiving, 8 cents; Columbus Day, 9 cents; Dollar Day, 10 for 1.00 dollar; Christmas, 11 cents; Lincoln's Birthday, 12 cents; July 4th, 13 cents; Easter, 14 cents; Father's Day, 15 cents; Back to School, 6 for $1.00; New Year's Eve, 4 for $1.00; Election Day, 2 for $1.00; Veteran's Day, $1.00; Mother's Day $5, and a blank card which can be used as a wild card or joker to make any desired combination. Since there are four cards of the same value in different suits and four wild cards, many different combinations can be formed, similar to those in well-known card games such as poker. The following table indicates the Rank and Value of the various hands or combinations. Since up to six cards are dealt to each player according to the managerial status, the best possible combination is six of a kind. The players, if they so desire, may also make individual wagers on the best card combinations.

player having that card would receive $75. After each player completes his turn, the used display cards are collected and placed face up on the bottom of the stack and new cards dealt out for the next player and the game continues as described until a winner is determined.

The present invention thus provides a novel, entertaining game depicting the retailing and discount store business. While only a single embodiment has been illustrated, it is apparent that many variations may be made in the particular form and procedure without departing from the scope of the invention as set forth in the appended claims.

I claim:

1. A game apparatus comprising a playing board including a continuous playing path of a plurality of successive delineated spaces, groups of said spaces having indicia thereon the terms of which relate to retail store sale days and monetary awards; a plurality of markers to indicate individual players; a means of chance to indicate the movement of each marker in turn a number of spaces along said path; stacks of cards having indicia thereon the terms of which relate to awards, penalties and managerial position changes, the cards of each stack having a common indicia different from each other stack, designated spaces in said path being associated with particular stacks by indicia corresponding to said common indicia; means for indicating and displaying the managerial position of each player in correspondence with the indicia on said cards; and a supply of play money for payment of various awards and penalties.

2. The game apparatus of claim 1 including a further group of sales display cards, said display cards having graduated numbers indicating prices of merchandise, each said display card having indicia thereon corresponding to a particular sale day on said spaces, said display cards being grouped in respective suits having common markings and the same repetitive numbers and sale days.

3. The game apparatus of claim 2 wherein said means for indicating and displaying the managerial position comprises a rack for each player having a graduated chart of positions thereon with assigned salaries and commissions, higher positions being assigned higher salaries and commissions, each position on the chart having a hole, removable pegs for insertion into the holes to mark the player's position, and means on the rack for holding display cards.

4. The game apparatus of claim 3 wherein one of said spaces indicates the start of the game and a pay day.

5. The game apparatus of claim 4 wherein further designated spaces have indicia the terms of which permit a

RANK AND VALUE TABLE OF WINDOW CARDS

| | Description | Name | Dollar value |
|---|---|---|---|
| Rank: | | | |
| 1 | Six of a kind | Big Bargain Bonanza | 1,000 |
| 2 | Six card sequence, same suit | Bargain Festival | 500 |
| 3 | Five of a kind | Bargain Dazzlers | 250 |
| 4 | Five card sequence, same suit | Super Bargain Specials | 240 |
| 5 | Four of a kind and one pair or three of a kind twice (six cards) | Bargains Galore | 230 |
| 6 | Six cards in the same suit, or six card sequence, not in suit | Week-O-Bargains | 220 |
| 7 | Four of a kind | Bargains-A-Go-Go | 200 |
| 8 | Three of a kind and a pair (total of 5 cards) | Full House-O-Bargains | 180 |
| 9 | Five cards in the same suit | Bargain Salute | 170 |
| 10 | Five cards in sequence, not in suit | Bargain Broadside | 160 |
| 11 | Three of a kind | Super Saving Bargain Days | 150 |
| 12 | Two pairs | Bargain Twins | 100 |
| 13 | One Pair | Bargain Daze | 60 |
| 14 | High card | Today's Special | 50 |

Further awards are due if the player whose turn it is lands on a space designating a sale day for which he has a window display card. In this case the commission due him is doubled. If another player has that sale day card, that player is paid a single commission. For example, if a manager of a No. 2 store, which normally has a double commission rate, lands on the Dollar Day box which calls for a $75 commission, the player would normally get $150. However, if he has the corresponding window display card, he receives $300, while another free selection of a card from any of said stacks.

6. The game apparatus of claim 5 wherein one card of said stacks of cards indicates the position of President of the Company.

7. The game apparatus of claim 6 wherein said board includes four sides and said stacks include three in number each having said different common indicia thereon, each side having three designated spaces associated with respective stacks by corresponding indicia.